(12) United States Patent
Childers

(10) Patent No.: US 6,452,096 B1
(45) Date of Patent: Sep. 17, 2002

(54) EDGE PROTECTOR FOR ELECTRICAL JUNCTION BOXES

(76) Inventor: Richard A. Childers, 10091 S. Sheridan, No. 920, Tulsa, OK (US) 74133

( * ) Notice: Subject to any disclaimer, the term of this patent is extended or adjusted under 35 U.S.C. 154(b) by 0 days.

(21) Appl. No.: 09/862,718

(22) Filed: May 22, 2001

(51) Int. Cl.[7] .................................................. H02G 3/08
(52) U.S. Cl. ........................ 174/50; 174/135; 174/48; 174/53; 220/3.2
(58) Field of Search ........................... 174/50, 48, 49, 174/53, 54, 55, 56, 17 R, 57, 58, 59, 60, 61, 65 R, 65 G, 68.1, 73.1, 74, 101, 135; 220/3.2, 3.3, 3.4, 3.5, 3.6, 3.7, 3.8, 3.9, 4.02; 52/220.1

(56) References Cited

U.S. PATENT DOCUMENTS

| | | | |
|---|---|---|---|
| 1,995,340 A | 3/1935 | Buxton | 175/376 |
| 2,515,724 A | 7/1950 | McCroskey | 175/376 |
| 2,727,721 A | 12/1955 | Pinkerton | 254/134.3 |
| 2,746,715 A | 5/1956 | Sherrod | 254/134.3 |
| 3,037,744 A | 6/1962 | Cooper | 254/134.3 |
| 3,113,759 A | 12/1963 | Lindmark | 254/134.3 |
| 3,944,184 A | 3/1976 | Fisch | |
| 4,033,551 A | 7/1977 | Lindstrom | |
| 4,092,813 A * | 6/1978 | Eggert | 52/716.5 |
| 4,132,665 A | 1/1979 | Nelson | |
| 4,358,089 A | 11/1982 | Metcalf | |
| 4,372,083 A * | 2/1983 | Hatzikelis et al. | 49/462 |
| 4,443,508 A * | 4/1984 | Mehl | 16/86 A |
| 4,541,615 A | 9/1985 | King, Jr. | |
| 4,776,928 A * | 10/1988 | Perlich | 205/76 |
| 4,877,673 A * | 10/1989 | Eckel et al. | 248/345.1 |
| 4,946,137 A | 8/1990 | Adamczek | |
| 4,951,923 A | 8/1990 | Couture | |
| 5,029,817 A | 7/1991 | Tamm | |
| 5,236,177 A | 8/1993 | Tamm | |
| 5,271,605 A | 12/1993 | Damron | |
| 5,340,133 A * | 8/1994 | Trubiano | D34/27 |
| D401,907 S | 12/1998 | Gazerro | D13/155 |
| 6,274,012 B1 * | 8/2001 | Santoyo | 204/279 |

FOREIGN PATENT DOCUMENTS

| | | | |
|---|---|---|---|
| EP | 0134159 | * 3/1985 | 296/93 |
| GB | 2334038 | * 11/1999 | 204/279 |

* cited by examiner

Primary Examiner—Dean A. Reichard
Assistant Examiner—Angel R. Estrada
(74) Attorney, Agent, or Firm—Fellers, Snider, Blankenship, Bailey & Tippens, P.C.

(57) ABSTRACT

This invention relates generally to the field of commercial and residential electrical wiring installation and, more specifically, to the protection of electrical wires when they are pulled into and out of electrical junction or other electrical wiring boxes. The preferred embodiment takes the form of a rectangular frame which snaps onto and covers the sharp upper edges of a box through which wire is to be pulled. It is preferable that the upper surface of the instant invention be manufactured so as to be smooth and rounded so that wire may pass over it with out risk of damage. Additionally, the preferred method of attaching the instant device to the junction box is by way of a slot or groove which has been cut so as to match the box dimensions as nearly as is possible.

12 Claims, 1 Drawing Sheet

EDGE PROTECTOR FOR ELECTRICAL JUNCTION BOXES

FIELD OF THE INVENTION

This invention relates generally to the field of commercial and residential electrical wiring installation and, more specifically, to the protection of electrical wires when they are pulled into and out of electrical junction or other electrical wiring boxes.

BACKGROUND OF THE INVENTION

As part of the process of installing or removing electrical wiring and/or fiber optics in commercial and residential buildings, it is common practice to run wire through tubular metal pipes or conduits which might be located in the walls, ceiling, floors, etc. The conduit runs terminate in open faced metallic junction boxes which provide access to the wiring which is otherwise encased within conduit. It is customary to securely mount these boxes within a wall, the ceiling , or the floor. During installation, wiring is pulled through a box and into the conduit until such time as the necessary length of wire within (and outside of) the conduit is obtained. In a related operation, it may be necessary to remove existing wiring from a single conduit or a an entire building, in which case the wiring is pulled out of the conduit. However, since these two operations implicate similar concerns, they will not be discussed separately hereinafter. Additionally, note that the term "wires" and "wiring" as they are used hereinafter will be used in the broadest possible sense to refer to conventional electrical power lines, as well as to computer network cables (including thick and thin Ethernet, twisted pair, etc.), fiber optic lines, etc.

Pulling wires into junction boxes and through the conduit fixtures can be a very difficult process because of friction between the wiring and the conduit. As a consequence, it may require a great deal of force to move the wire through the junction box and into the conduit. However, it is well known to those skilled in the art that the process of pulling wire into or out of a junction box risks damage to the wire from the sharp edges of that box. Pulling the wire across the edges of the junction box—and especially where that is done with great force—can potentially abrade the insulation covering of the wires, which can in some cases completely expose the interior of the wire. Obviously, wiring that has been damaged in this way poses a long-term threat to the integrity of the building wiring system.

In an ideal scenario, the conscientious electrician will strive to orient the wire so that it exits the box as nearly as possible at a 180 degree angle with respect to the conduit, so that when it is pulled the amount of friction generated thereby is reduced. This orientation also tends to minimize the risk of physical damage from the sharp edges of the junction box as the wire is moved past. Further, and in a perfect world, there will be another person on the other end of the wire to guide it into the box, thereby minimizing the same risks on the opposite end.

However, it is not always possible to pull the wire at the optimum angle because, for example, the box may be mounted near the floor or high above the electrician's head on the ceiling. (When working on a ladder it is much safer to pull "down" than "laterally".) Further, the increased cost and inconvenience occasioned by the involvement of another person at the other end of the wire to guide it into the box may result in the electrician just performing the task by him or herself, at a risk of skinning the installed wire. As a consequence, it is not unusual to see an electrician pulling wire through the wall unassisted. Finally, even when it might be possible to do otherwise, some employees might choose not to pull at the "optimum" angle because they believe there is no real risk of damage to the wire or perhaps because it is just easier to do this operation incorrectly.

Others have considered this problem but the solutions suggested heretofore have not been entirely satisfactory. Wire guides in the shape of curved horns have been suggested for attachment to one end of a conduit where it is mounted to ajunction box so that the wires may be fed into the conduit at a proper angle. One example of such a device is described in U.S. Pat. No. 2,515,724. In U.S. Pat. No. 4,132,665, a rigid funnel for use in feeding wires through ajunction box and associated conduit is disclosed. These prior art devices have not found broad acceptance in the related trades because they tend to be relatively large and bulky and not very easy to use.

Other approaches use various combinations of rollers and pulleys. However, these approaches suffer from the disadvantage that they must be securely attached to the box, usually with thumb screws or the like (which results in additional time being spent to install and remove the device). Additionally, roller-based solutions are subject to their own friction/crimping problems. For example, if the wire is pulled at an angle that causes it to rub against a roller guide or roller support, binding of the wire and scraping of the insulation may result. Thus, these sorts of solutions can only accommodate wires that enter the device within a fairly narrow range of angles. Finally, solutions involving rollers or pulleys also tend to be relatively bulky and expensive to build. Since these sorts of devices are installed remotely from where the user is actually working, it is inevitable that the device will at least occasionally be forgotten and left at the job site where it could be lost or stolen. Obviously, the more expensive the device the less likely that an electrician would be willing to replace it and the electrician might choose instead to risk the possibility that hidden damage might be introduced into wires, which damage might not be discovered until months or years later. Examples of such prior art devices are disclosed in U.S. Letters Pat. Nos. 4,358,089; 4,033,551; 3,944,184; 3,113,759; 2,746,715; and 2,727,721. These references teach rigidly mounted, or rigidly held guides or pulleys which they can be used either for pulling wires into, or out of, electrical conduit.

Heretofore, as is well known in the electrical arts, there has been a need for an invention to address and solve the above-described problems. Accordingly, it should now be recognized, as was recognized by the present inventor, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

In accordance with a preferred aspect of the instant invention, there is provided an electrical wire guide which serves to protect one or more insulated electrical wires as they are drawn into or pulled out of an electrical wiring junction box or similar rigidly mounted device.

Broadly speaking, the instant device is an edge protector which fits snugly over all four edges of a conventional junction box. The preferred embodiment takes the form of a rectangular frame which snaps onto and covers the sharp upper/outer edges of a box through which wire is to be pulled. It is preferable that the upper surface of the instant invention, i.e., the portion of the instant device that contacts the wire, be manufactured so as to be smooth and rounded so that wire may pass over it with out risk of damage. The rounded portion of the device is stationary, i.e, non-rotating, so that it is critical that at least this portion present a smooth contact surface to the wire. Additionally, the preferred method of attaching the instant device to the junction box is by way of a slot or groove which has been cut so as to match the box dimensions as nearly as is possible. Thus, the instant device is preferably held in place by friction. Of course, it is well within the ability of one having ordinary skill in the art to adapt this device to work with junction boxes that are shaped other than as a rectangle (e.g., a round junction box). It is critical, though, that all of the edges of the junction box be covered by the device of the instant application.

Among the many advantages to the sort of tool taught herein are the simplicity of its design which means that it can be built and marketed relatively inexpensively; its ease of installation and removal; its ability to accommodate electrical lines coming into (and exiting from) the box at any angle; its low profile and light weight which makes it possible for the electrician to carry a number of these devices on his or her person; and, its ability to be installed on boxes which have been enclosed within walls that are covered by plaster or wall board. The design of the instant device will allow it to work, for example, in multi-gang boxes, through wall boxes, and all tile and plaster rings regardless of their thickness.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Further, the disclosure that follows is intended to cover all alternatives, modifications and equivalents as may be included within the spirit and scope of the invention as defined by the appended claims. Finally, it should be understood that the phraseology and terminology employed herein are for the purpose of description and should not be regarded as limiting, unless the specification specifically so limits the invention.

While the instant invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawings in which.

DETAILED DESCRIPTION OF THE INVENTION

Figure 1:
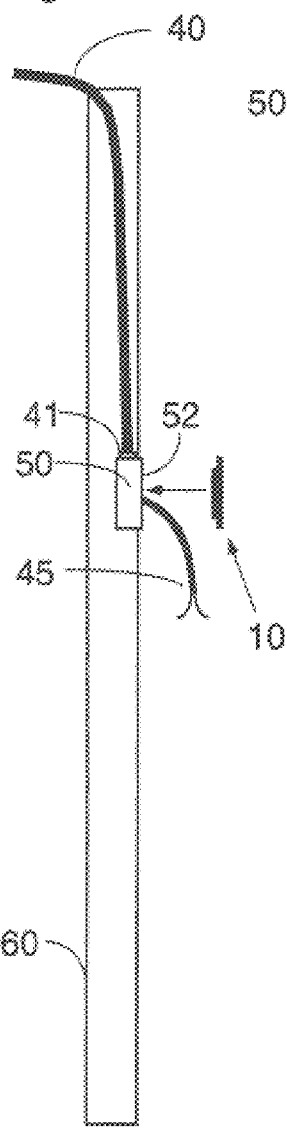
FIG. 1 illustrates the general environment of the instant invention.

According to a preferred embodiment of the instant invention and as is illustrated in FIG. 1, the general environment of the invention concerns installation of electrical lines 45 during new construction or remodeling. It is frequently necessary as part of the installation process to pull (or push) these electrical wires 45 through a metal conduit 40 and into junction box 50. However, the process of passing the wire through the junction box 50 can result in damage to the exterior insulation of the wires passing therethrough. This is because junction boxes 50 are typically made of steel or other non-yielding materials and their edges 52 (FIG. 2) are relatively abrasive. Thus, when wires that are passed under tension across one of these edges, there is always some risk that the electrical insulation that coats the wires will be cut or scraped away. Damaging and/or removing the insulation, of course, risks later short circuits with an attendant risk of electrical shock and/or fire. Additionally, the exposed edges of junction box 50 pose a risk to the installing electrician, as cuts and scrapes to the skin of his or her hands from that source are an occupational hazard.

The preferred embodiment of the instant invention 10 is designed to address and mitigate the above described problems. As is broadly illustrated in FIG. 1, the inventive device 10 is designed to be removably attached to a junction box 50 by pressing it against the outer edges 52 of that box, where "outer" indicates a direction away from the wall on which the box is mounted and generally refers to the open face of the junction box into which line is inserted. The instant invention 10 operates by covering all of the outer edges 52 of the junction box 50 with a smoothed and rounded surface, over which electrical lines may be pulled with significantly lowered risk of damage. Junction box 50 would typically be attached to a stud 60 or other support member to hold it in place.

Figure 2:
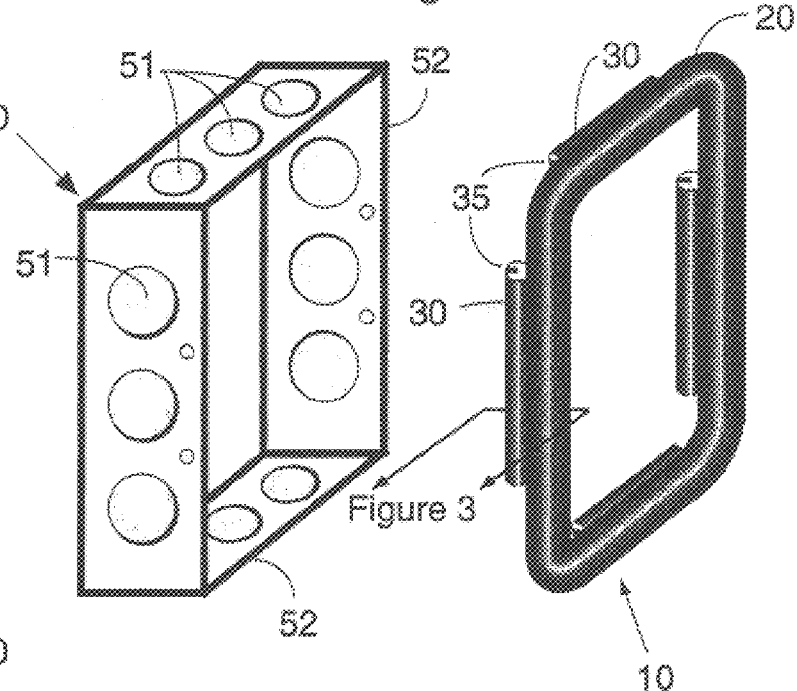
FIG. 2 contains a more detailed drawing of a preferred embodiment of the instant invention.

FIG. 2 contains a more detailed view of one preferred embodiment of the instant invention. The preferred embodiment consists of an upper tubular (or "contact") member 20 over which electrical lines 45 under tension will be pulled. Lower tubular (or "engaging") members 30, which are permanently attached to upper tubular members 20, preferably contain an aperture 35 cut therein, which is designed to mate with the outer edges of junction box 50. The two tubular members of the instant embodiment are preferably both made of stainless steel tubing and are permanently bonded together by welding, gluing, etc. Of course, it is not essential that members 20 and 30 be hollow, and solid cylindrical rods would function just as well. Further, the upper member 20 need not be completely round in cross section, but might be any shape, so long as the portion of its surface that contacts the wire bundle is substantially rounded. Thus, upper member 20 might be made in almost any overall shape so long as it presents a rounded feature for contact with the wire. It is critical that the upper member 20 be stationary (i,.e., non-rotating) so it is important that it be manufactured to be as smooth as possible to reduce the friction between this member and the wire that is drawn against it. It is also critical that the upper member 20 present an uninterrupted (continuous) surface to the wire: any gaps or breaks in the upper surface would provide an opportunity for the wire to become trapped therein. Finally, although it is generally anticipated that the overall dimensions of the upper member 20 will at least roughly match to those of the outer edge of the junction box 50 (see, for example, FIG. 2, wherein the dimensions of upper member 20 are commensurate with those of the opening in the junction box 50), that is not strictly required. The upper member 20 needs to be large enough to enclose the bundle of wire that is pulled into the box 50, but otherwise may be of an arbitrary continuous shape. The engaging member 30, though, must be sized to match the dimensions of the outer edge of the junction box 50, so as to frictionally mate with it.

In practice, the invention 10 would be pressed against the outer face of the junction box 50, mating together the aperture 35 of the lower tubular member 30 with the outer edges of the junction box 50. Needless to say, the aperture 35 will have been appropriately sized to accommodate the face (i.e., the exposed edges 52) of a standard junction box 50 throughout its entire perimeter. This mating secures the instant invention 10 to the junction box 50 through frictional forces, where it is held in place until it is removed by the installer. Additionally, as wire is drawn across the device 10, the pressure exerted by wire will tend to keep the device 10 engaged with the box 50. Finally, it is preferable—though not essential—that the aperture 35 of the lower tubular member 30 be sized so that it exerts some gripping force on the edges of the box 50 that it surrounds. That is, in the preferred embodiment the aperture 35 will be sized to be slightly smaller than the thickness of the target junction box.

During the time that it is mounted on the junction box 50, the edge protector 10 shields the sharp edges of junction box 50 from contact with electrical insulation and with human skin. The smooth upper surface (upper/outer face of tubular member 20) of the instant device 10 permits great pressure to be applied to the wire 45 during installation, without fear that it will be damaged by scraping it against the junction box face. Once the wire has been pulled into (pushed through) a given junction box 50, the instant invention 10 can easily be removed for installation at another location.

Although the instant edge protector 10 has been pictured and discussed as consisting of one tubular member surmounted by another, this is only one possible arrangement and the instant inventor realizes that other variations are certainly possible. However, before discussing some alternative variations, it should be noted that in the preferred embodiment the instant device 10 will be designed so that, after it is installed, it will not interfere with the operation of the lock nut 41 which is typically affixed to the connector between the junction box 50 and the conduit 40, nor will it preferably interfere with the junction box knock-outs 51 that are available for removal by the installer. Thus, in the preferred embodiment the instant invention 10 will not cover up too much of the outer edge of the junction box 50 opening.

Figure 4:
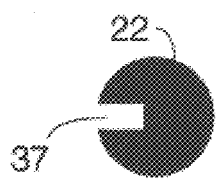
FIG. 4 is cross section of another preferred embodiment of the instant invention.

FIG. 4 illustrates a cross section of another preferred embodiment, which consists of a single cylindrical tube 22 into which a groove 37 has been cut. As is generally illustrated in FIG. 4, in a preferred embodiment four such cylindrical tubes 22 would be arranged end-to-end into a rectangular framework to match the dimensions of the target box. The instant embodiment 22 has a very low profile which could be used to advantage in some situations.

Figure 3:
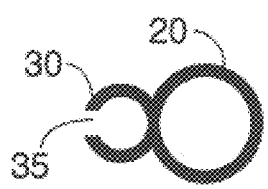
FIG. 3 is a cross sectional view of the device of FIG. 2.

However, in other cases—e.g., where greater height is needed to keep the wire away from, say, installed and finished walls—the embodiment 10 of FIG. 3 would be more appropriate. Once again, stainless steel is the preferred material from which to construct the instant device because of its durability. That being said, many alternative materials—including hard plastics and ceramics—might be used instead. It is essential, though, that the material that is selected be rugged enough to accommodate the weight of a large bundle of wire without deforming or failing. Further, the upper surface of contact member 20 must be capable of maintaining a smooth and rounded shape in the face of heavy pressure and abrasion by grit-laden wires.

Figure 5:
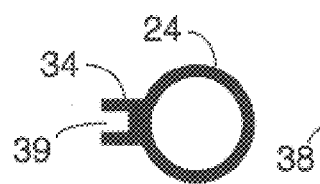
FIG. 5 is a cross section of still another preferred embodiment of the instant invention.

Additionally, FIG. 5 shows still another variant of the instant invention, wherein the lower tubular member 30 has been replaced with an engaging member 34. In operation, this embodiment would function exactly as before, as the engaging member 34 is designed to mate with and engage (preferably frictionally) the outer edge of the junction box 50. Further, the instant inventor has specifically contemplated that there are any number of alternative means of removably attaching the instant invention to a junction box beyond those discussed above, including various clips, snaps, straps, ties, etc. Still further, although the instant invention 10 is preferably designed to be easily removed, that is not an absolute requirement. Additional stability in the device 10 may be obtained by more permanently mounting it to the box. For example, by adding inwardly sloping glazer's points or "teeth" to at least one of the inner surfaces of the engaging member 34, a variation would be produced that would be difficult to remove from the junction box 50, but would be easily mounted and very stable after it was installed. Thus, as used herein, the term "frictionally" should be used in its broadest possible sense to include any attachment mechanism short of screws, nuts, bolts, etc.

Figure 6:
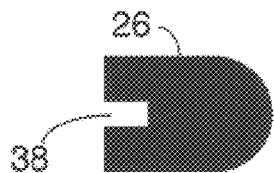
FIG. 6 contains a cross section of still another preferred embodiment of the instant invention.

Finally, as has been noted previously, so-called tubular member 20 need not necessarily be cylindrically tubular. All that is essential is that its upper surface be rounded, whatever its overall shape. Thus, as a specific example, it is within the ambit of the instant invention that this member might be chosen to be generally rectangular in cross section, so long as its upper/outer surface is rounded and without comers or sharp edges that might catch wires that are pulled across it (e.g., see FIG. 6, wherein engaging member 38 is created within a generally rectangular upper member 26).

Thus, it is apparent that there has been provided, in accordance with the invention, a wire guard that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. An apparatus for the protection of wire during installation into or removal from a junction box, said junction box having an opening therein for receiving said wire, said opening in said junction box having an outer edge, comprising:

(a) a rigid upper member having a stationary continuous upper surface and a lower surface, said upper member being positionable to lie between said outer edge and said wire, (a1) said upper surface being positionable to contact said wire during installation or removal, and, (a2) said upper surface being substantially rounded where it contacts said wire during installation or removal; and, (b) a rigid lower member, said lower member having an upper and lower surface, (b1) said upper surface of said lower member being affixed to said lower surface of said upper member, and, (b2) said lower surface of said lower member containing an engaging member, said engaging member being positionable to removably engage said junction box outer edge, said engaging member having dimensions commensurate with said junction box outer edge for engaging said junction box outer edge at a plurality of locations.

2. An apparatus according to claim 1, wherein said engaging member frictionally engages said junction box outer edge.

3. An apparatus according to claim 1, wherein said upper member is substantially circular in cross section.

4. An apparatus according to claim 1, wherein said lower member is substantially circular in cross section, and wherein said engaging member is an aperture running a length of said lower member, said aperture being sized to accommodate said outer edge of said junction box and frictionally mate thereto when so positioned.

5. An apparatus according to claim 1, wherein said junction box opening is substantially rectangular, and wherein said upper member is also substantially rectangular.

6. An apparatus according to claim 1, wherein said junction box outer edge has a perimeter, and wherein said engaging member frictionally engages said junction box outer edge substantially continuously throughout said perimeter.

7. An apparatus for the protection of wire during installation into or removal from a junction box, said junction box having an opening therein for receiving said wire, said junction box opening having an outer edge, comprising:

(a) a stationary contact member having a continuous upper surface and a lower engaging surface, said upper surface being positionable to lie between said outer edge and said wire, (a1) said upper surface being positionable to contact said wire during installation or removal, (a2) said upper surface being substantially rounded where it contacts said wire; and, (a3) said engaging surface including an engaging member, said engaging member (i) being positionable to engage said junction box outer edge, and, (ii) having dimensions commensurate with said junction box outer edge for engaging said junction box outer edge at a plurality of locations.

8. An apparatus according to claim 7, wherein said engaging member frictionally engages said junction box outer edge.

9. An apparatus according to claim 7, wherein said upper surface is substantially circular in cross section.

10. An apparatus according to claim 7, wherein said engaging surface is substantially circular in cross section, and wherein said engaging member is an aperture running a length of said lower member, said aperture being sized to accommodate said outer edge of said junction box.

11. An apparatus according to claim 7, wherein said junction box opening is substantially rectangular, and wherein said upper surface is also substantially rectangular.

12. An apparatus according to claim 7, wherein said junction box outer edge has a perimeter, and wherein said engaging member frictionally engages said junction box outer edge substantially continuously throughout said perimeter.

* * * * *